(12) United States Patent  
Takase et al.

(10) Patent No.: US 7,105,748 B2
(45) Date of Patent: Sep. 12, 2006

(54) DOOR MODULE FOR A VEHICLE

(75) Inventors: Kouji Takase, Yokkaichi (JP); Yukio Yamamoto, Yokkaichi (JP); Hidenobu Ojima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 11/014,112

(22) Filed: Dec. 17, 2004

(65) Prior Publication Data

US 2005/0148213 A1 Jul. 7, 2005

(30) Foreign Application Priority Data

Dec. 19, 2003 (JP) .............................. 2003-423283

(51) Int. Cl.
*H02G 1/00* (2006.01)
(52) U.S. Cl. ................. 174/72 A; 174/135; 174/138 G
(58) Field of Classification Search .............. 174/72 A, 174/135, 172, 138 G
See application file for complete search history.

(56) References Cited

U.S. PATENT DOCUMENTS

| 4,907,836 A | 3/1990 | Ueda et al. |
| 5,092,647 A | 3/1992 | Ueda et al. |
| 5,460,530 A | 10/1995 | Toba et al. |
| 5,735,041 A | 4/1998 | Zaguskin et al. |
| 5,743,010 A | 4/1998 | Zaguskin et al. |
| 5,929,382 A | 7/1999 | Moore et al. |
| 6,417,451 B1 | 7/2002 | Uchiyama |
| 6,536,835 B1 | 3/2003 | Murakami et al. |

FOREIGN PATENT DOCUMENTS

JP 2002-280126 9/2002

OTHER PUBLICATIONS

English Language Abstract of JP 2003-280126.
U.S. Appl. No. 11/012,268 to Ojima et al . . . , which was filed Dec. 16, 2004.

*Primary Examiner*—Jinhee Lee
(74) *Attorney, Agent, or Firm*—Greenblum & Bernstein, P.L.C.

(57) ABSTRACT

The invention relates to a door module including a detachable panel and configured to wire a door harness. The detachable panel is configured to fit into a recessed portion formed in a door inner panel of a vehicle, and the door harness includes a trunk wire harness portion and at least two branched wire harness portions connected to the trunk wire harness portion and extending along branching directions from a branching point. The detachable panel is integrally provided with at least two projections each having rectangular faces configured to hold the branching point of the door harness. These projections are arranged to define a gap which has substantially the same size as the diameter of the trunk wire harness portion, so that the gap can grip the trunk wire harness portion, when it is mounted, from both sides thereof near the branching point, while the rectangular faces extend along the branched wire harnesses and guide them in the branching directions.

20 Claims, 8 Drawing Sheets

DOOR MODULE FOR A VEHICLE

BACKGROUND OF THE INVENTION

1. Field of the Invention

The present invention relates to a door module mounted in a vehicle and, in particular, to a door module previously mounted in a door panel. In the door module of the present invention, a wire harness is positioned in the panel and fixed thereto without using a clip.

2. Description of Background Information

FIGS. 1A and 1B show a door harness of a vehicle and electrical equipment connected thereto according to the prior art. In this structure, a band clip 4 having a hook-type fastener 4a is attached to the wire harness W. The fastener 4a is then inserted into a clip-fastening hole 2 formed in the door panel 1, whereby the position of the wire harness W is fixed relative to the door panel 1. Also, an L-shaped configuring clip 3 which is integral to the door panel 1 is provided to hold the wire harness W. In this manner, the wire harness is wired along a predetermined path so as to form a door module.

However, the above door module requires specifically prepared band clips 4 for positioning and fixing the wire harness, and thus increases the number of component parts, material costs and assembly steps.

To counter these problems, the present inventors proposed in Japanese Application No. 2002-280126 a door module 6 requiring no special clips (see FIGS. 2A and 2B). In this structure, a door panel 5 includes an integrally-formed harness-holding portion 6. This portion includes projections 6a, 6b and 6c that are placed in triangular arrays on the door panel 5. At least one of the projections, e.g., 6a, is made substantially L-shaped, whereas the other projections, i.e., 6b and 6c are made in round column shapes. As shown in FIG. 2B, when the wire harness W is branched, projection 6a holds at the point of bifurcation, and the projections 6b and 6c flank and adjust the branching point.

However, since the projections 6b and 6c in the door module 6 have a round column shape, they can determine the branching position, but not the branching direction. Further, because at least one projection, e.g., 6a has to have an L-shape, dies for forming the door panel 5 have to be configured in a complex form and require a greater number of molding steps. Moreover, when the above structure is to be applied to a wire harness dividing into three branches or more, the harness-holding portion 6 has to have a much more complicated configuration.

SUMMARY OF THE INVENTION

To solve such problems, the present invention proposes a door module having a simple structure and using no special clips. The door module of the present invention includes one or several projections which can hold the wire harness, fix the position of the branching of that harness, and guide the direction of the branched harnesses.

In the structure of the present invention, the wire harness is pushed into the area between at least two projections and held therebetween, so that the wire harness is fixed for securing its direction and prevented from falling off. If, for one reason or another, the wire harness is pulled strongly toward the passenger compartment of the vehicle, the trim that typically covers the compartment-side face of the door module can attenuate such force. Accordingly, there is no need to provide special clips for fixing the wire harness to the door panel, or to provide an L-shaped projection for hooking the wire harness in order to prevent it from detaching.

An aspect of the present invention provides a door harness having a trunk wire harness portion and at least two branched wire harness portions connected to the trunk wire harness portion and extending along branching directions from a first branching point, the door module including a detachable panel configured to fit into a recessed portion formed in a door inner panel of a vehicle; and at least first and second projections integrally provided on the detachable panel, each projection having rectangular faces to hold the first branching point of the door harness, wherein the at least first and second projections are arranged to define a gap, the gap having substantially the same size as the diameter of the trunk wire harness portion, whereby the gap is configured to grip the trunk wire harness portion when the trunk wire harness portion is mounted, from both sides thereof near the first branching point, and wherein the rectangular faces extend along the branched wire harness portions and guide the branched wire harness portions in the branching directions. According to a further aspect of the present invention, the first branching point is defined by a first side proximal to a body panel of the vehicle and a second side distal therefrom, wherein the first and second projections are placed in contact with one of the branched wire harness portions at the first side, and wherein a third projection is provided at the second side and placed in contact with the trunk wire harness portion and one of the branched wire harness portions at the second side. The detachable panel further includes a first substantially L-shaped projection provided adjacent the first branching point and configured to hold the trunk wire harness portion and one of the branched wire harness portions.

Further, the door harness includes at least two further branched wire harness portions connected to the trunk wire harness portion and extending in branching directions from a second branching point, wherein the detachable panel is integrally provided with at least fourth and fifth projections each having rectangular faces configured to hold the second branching point of the door harness, wherein the at least fourth and fifth projections are arranged to define a gap, the gap having substantially the same size as the diameter of the trunk wire harness portion, whereby the gap is configured to grip the trunk wire harness portion, when the trunk wire harness portion is mounted, from both sides thereof near the second branching point, and wherein the rectangular faces extend along the branched wire harness portions and guide the branched wire harness portions in the branching directions.

Additionally, the first and second branching points are defined, respectively, by a first side proximal to a body panel of the vehicle and a second side distal therefrom, wherein a sixth projection is provided at the second side of the second branching point and placed in contact with the trunk wire harness portion and one of the branched wire harness portions at the second side of the second branching point. Further, the detachable panel integrally includes a second substantially L-shaped projection positioned between the first branching point and the second branching point and configured to hold the trunk wire harness portion.

A further aspect of the present invention includes a system to wire a door harness in a door inner panel, the door harness including a trunk wire harness portion and at least two branched wire harness portions connected to the trunk wire harness portion and extending along branching directions from a first branching point, the system including a door module including a detachable panel and configured to wire the door harness, the detachable panel configured to fit into a recessed portion formed in the door inner panel of a vehicle; at least first and second projections integrally provided on the detachable panel, each the first and second projections having rectangular faces to hold the first branching point of the door harness, wherein the at least first and second projections are arranged to define a gap, the gap having substantially the same size as the diameter of the trunk wire harness portion, whereby the gap is configured to grip the trunk wire harness portion, when the trunk wire harness portion is mounted, from both sides thereof near the first branching point, and wherein the rectangular faces extend along the branched wire harness portions and guide the branched wire harness portions in the branching directions.

In a further aspect of the present invention, the first branching point is defined by a first side proximal to a body panel of the vehicle and a second side distal therefrom, wherein the first and second projections are placed in contact with one of the branched wire harnesses at the first side, and wherein a third projection is provided at the second side and placed in contact with the trunk wire harness portion and one of the branched wire harness portions at the second side. Further, the detachable panel further includes a first substantially L-shaped projection positioned near the first branching point and configured to hold the trunk wire harness portion and one of the branched wire harness portions.

Additionally, the door harness includes at least two further branched wire harness portions connected to the trunk wire harness portion and extending in branching directions from a second branching point, wherein the detachable panel is integrally provided with at least fourth and fifth projections each having rectangular faces configured to hold the second branching point of the door harness, wherein the at least fourth and fifth projections are arranged to define a gap, the gap having substantially the same size as the diameter of the trunk wire harness portion, whereby the gap is configured to grip the trunk wire harness portion, when the trunk wire harness portion is mounted, from both sides thereof near the second branching point, and wherein the rectangular faces extend along the branched wire harness portions and guide the branched wire harness portions in the branching directions. Further, the detachable panel integrally includes a second substantially L-shaped projection positioned between the first branching point and the second branching point and configured to hold the trunk wire harness portion.

Further, the projections are substantially in the form of a rectangular parallelepiped, instead of a round form, and their rectangular faces are made to extend along the branched wire harnesses, so that the branching direction is guided. This configuration facilitates the wiring of the branched wire harnesses and can prevent miss-fitting between connectors attached at the edge portions of the branched wire harness and connectors of electrical equipment.

As can be understood, the door panel basically integrates just two projections. The door panel can be therefore easily manufactured at low costs. Further, the wire harness can be wired by merely pressing it into the area between the projections. Thus, there are no fixing operations as when the clips are used, and the operation for mounting the door harness is simplified.

When three projections are used, the positions of the branched wire harnesses can be shifted laterally (leftwardly or rightwardly), and vertically (upwardly or downwardly), and fixed thereafter in that shifted position. Further, to impose the branching direction, the wire harness and branched wire harnesses need simply be placed on a plurality of rectangular faces of the projection. The number of the projections, and thus manufacturing costs, can be reduced to minimum.

When several branched wire harnesses extend from the branching point, the above projections may be arranged in the periphery of, and surrounding, the branching position.

In this manner, as the projections may be disposed between the respective branched wire harnesses, the positions of the trunk portion of the wire harness and its branched wire harness portions can be fixed and their directions can be adjusted at the branching points. Such a configuration makes the door panel easily adaptable to various design change in harness-wiring.

When the trunk portion of the wire harness includes a long, non-branched part, e.g. when the branching point is positioned far from an edge of the wire harness, or when the branched wire harnesses are long, an L-shaped projection may be mounted on the door panel at an appropriate position over the wired length. In such case, the bent portion of the projection may be used to enclose the wire harness or its branches. As mentioned above, the present invention provides at least two projections having rectangular faces at the branching point of the trunk portion of the wire harness. In this manner, the non-branched part of that portion of the wire harness is held from both sides thereof, and the branched wire harness portions of the wire harnesses are guided along the branching directions by the rectangular faces of the projections.

As a result, it becomes unnecessary to prepare purpose-made clips, hitherto used for fixing the wire harness. Further, the number of projections integrated in the door panel can be reduced, and the forms of the projections are simplified. As the number of component parts and mounting steps is reduced, the manufacturing costs of the door panel are also lowered.

Further, when the projections are arranged in the periphery of, and surrounding, the branching point, the positions of the trunk portion of the wire harness and the branched portions of the wire harness can be shifted vertically (upwardly or downwardly), and laterally (leftwardly or rightwardly), in response to various branching configurations. The door harness can thus be wired with a great freedom.

BRIEF DESCRIPTION OF THE DRAWINGS

The above, and the other objects, features and advantages of the present invention will be made apparent from the following description of the preferred embodiments, give, as non-limiting examples, with references to the accompanying drawings, in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1A:
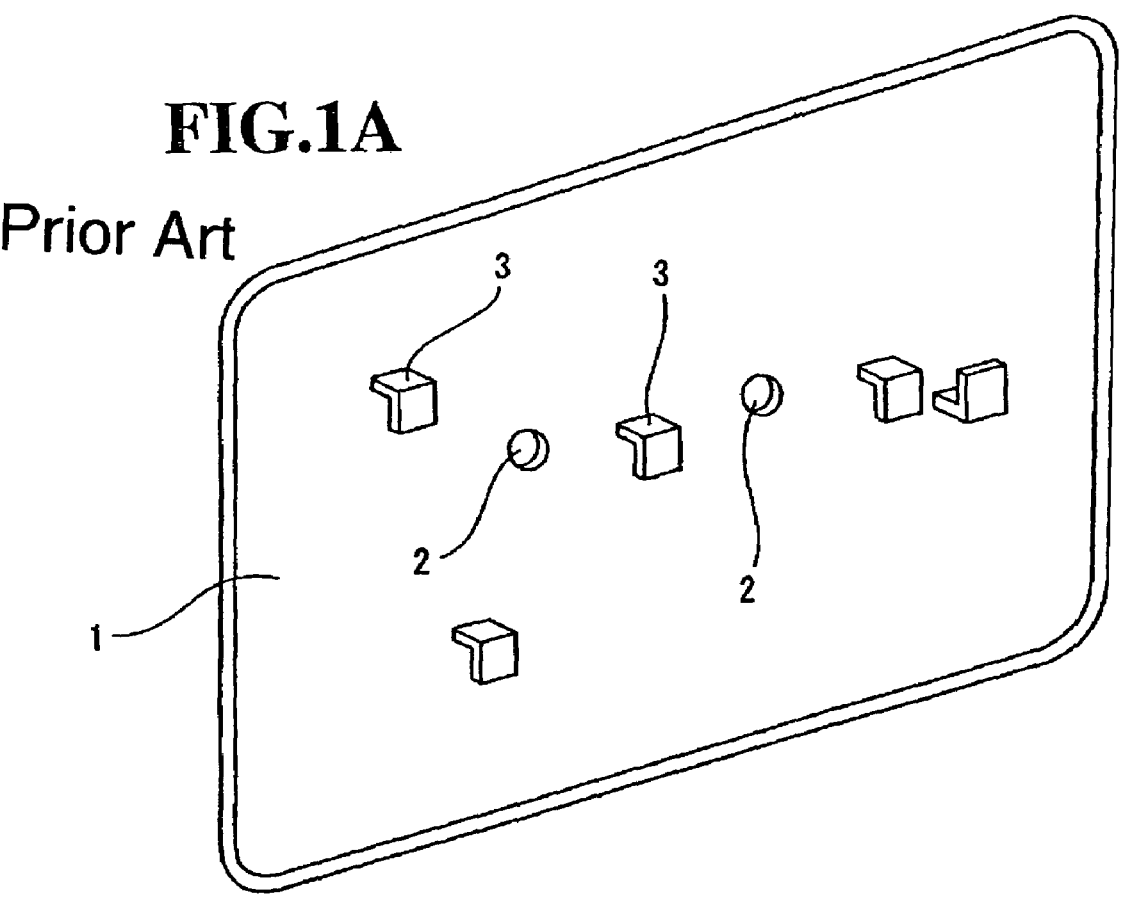
FIG. 1A is a perspective view of a prior art door module without the wiring harness.
Figure 1B:
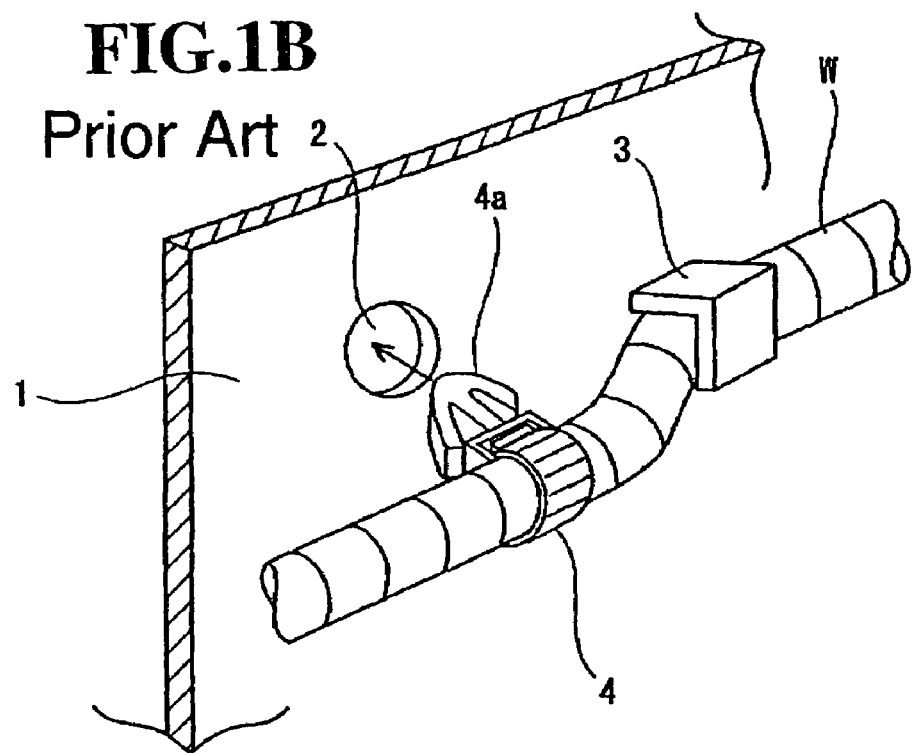
FIG. 1B is a perspective view of the prior art door module of FIG. 1A with the wiring harness.
Figure 2A:
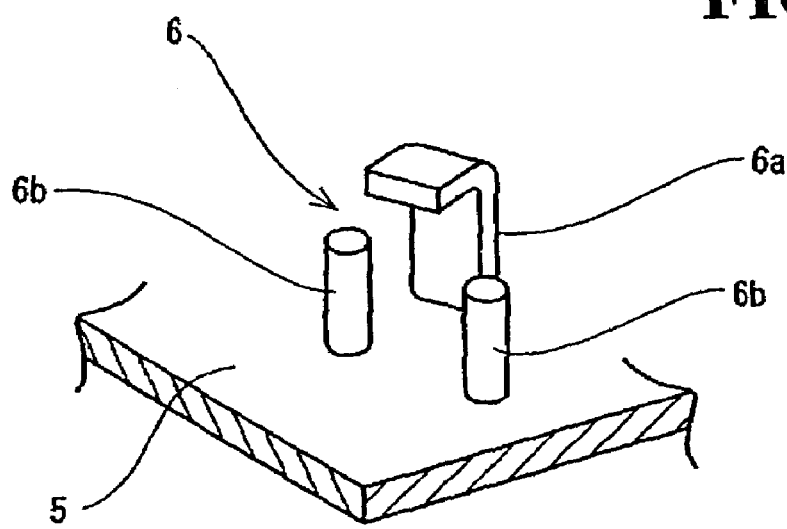
FIG. 2A is a perspective view of another prior art door module without the wiring harness.
Figure 2B:
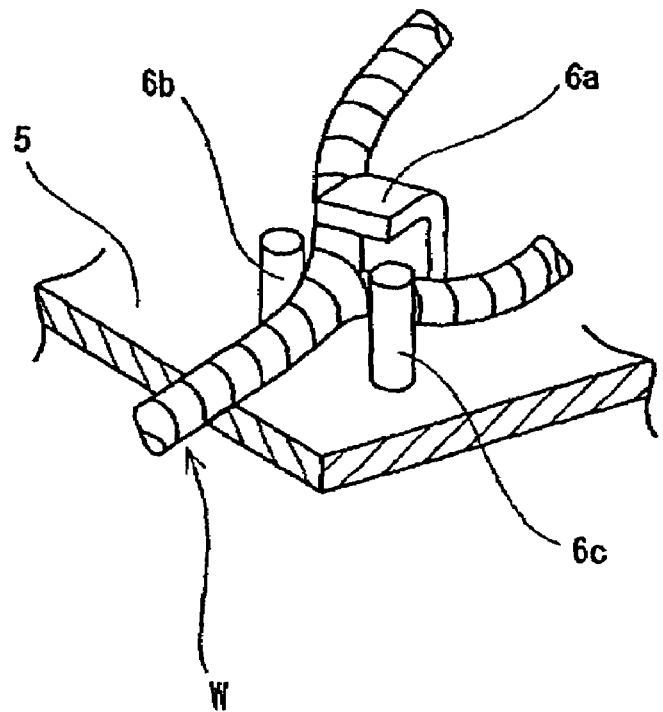
FIG. 2B is a perspective view of the prior art door module of FIG. 2A with the wiring harness.
Figure 3:
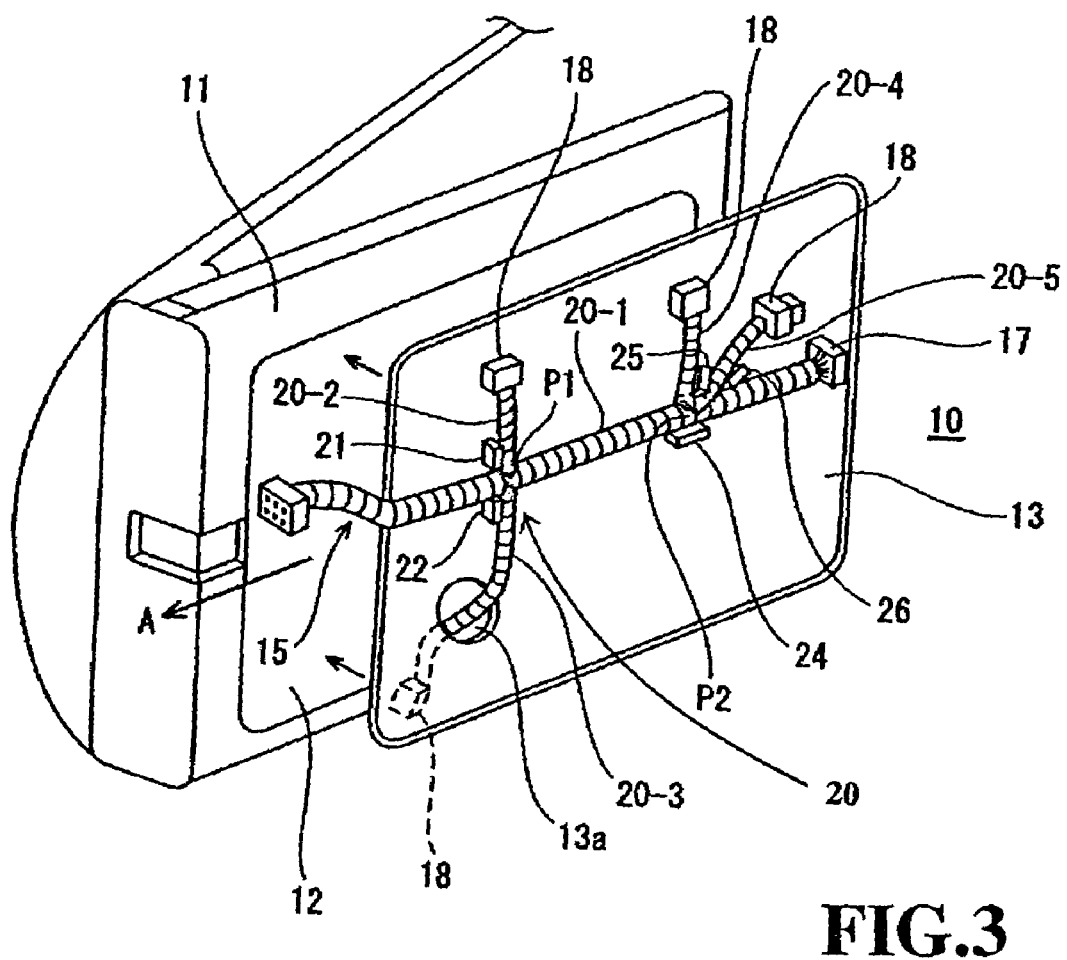
FIG. 3 is a perspective view of a door module according to a first embodiment of the present invention.
Figure 4:
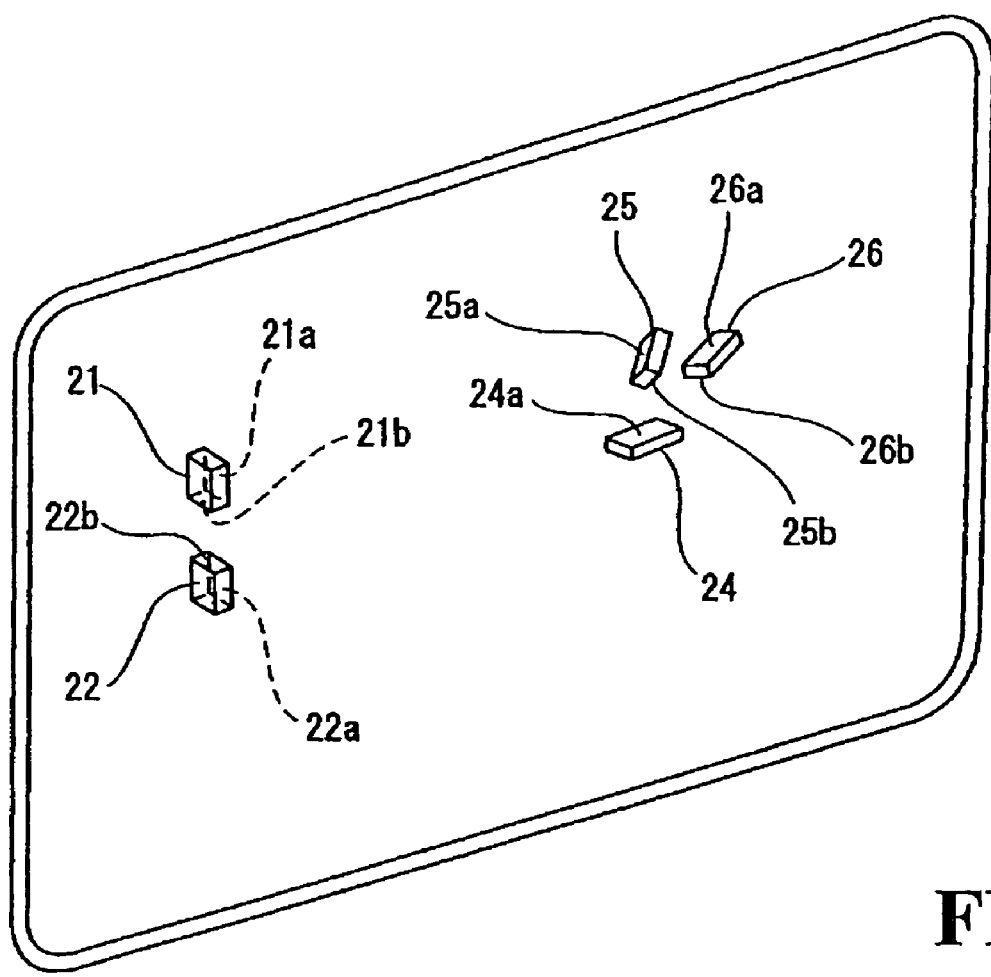
FIG. 4 is a perspective view of a detachable panel according to the embodiment of FIG. 3, before door harnesses are mounted thereon.

FIGS. 3 to 5 show a door module 10 according to a first embodiment of the invention. The door module 10 includes a detachable panel 13 which may be formed of any suitable material such as, for example, a resin. The detachable door panel 13 has been previously equipped with a door harness 20-1, 20-2, 20-3, 20-4, 20-5, a window power wind motor, a motor for a remote-controlled mirror, a power wind switch and a switch for a remote-controlled mirror. A door inner panel 11 of the door module has a recessed portion 12, into which the detachable panel 13 is fitted and fixed thereto. The door harness 20-1; 20-2, 20-3, 20-4, 20-5 wired on the detachable panel 13 may include, for example, a trunk or stem wire harness 20-1 portion and branched wire harness portions 20-2, 20-3, 20-4, 20-5. An end of the trunk portion 20-1 of the wire harness is connected to another wire harness located in a body panel of a vehicle (not shown in the figure), as illustrated in FIG. 3 by the arrow A. The other end of the trunk portion 20-1 of the wire harness is connected to an assembler connector 17, which is in turn connected to supplementary devices installed in the door inner panel 11. The trunk portion 20-1 of the wire harness is connected to a plurality of branched wire harness portions 20-2, 20-3, 20-4, 20-5 which extend upwardly or downwardly or at an angle, for example, diagonally. The ends of the branched wire harness portions 20-2, 20-3, 20-4, 20-5 are fitted with respective connectors 18, which are in turn connected to devices such as, for example, the power wind motor, etc.

The detachable panel 13 may be molded of a resin. As shown in FIG. 4, a plurality of projections, for example, designated by reference numerals 21, 22, 24, 25, 26 are provided on the inner face of the detachable panel 13 which faces the vehicle compartment. The projections 21, 22, 24, 25, 26 may be formed integrally and in one piece with the inner face of the detachable panel 13. The door wire harness is wired on this inner face of the detachable panel 13. The projections 21, 22, 24, 25, 26 each have a simple rectangular parallelepiped form projecting from the inner face of the detachable panel 13. In the illustrated example, two projections 21 and 22 are arranged at a first branching point P1 where the trunk portion of the wire harness 20-1 crosses with branched wire harness portions 20-2 and 20-3, and three projections 24, 25, and 26 are arranged at second branching point P2 where the trunk portion of the wire harness 20-1 crosses with branched wire harness portions 20-4 and 20-5.

Figure 5A:
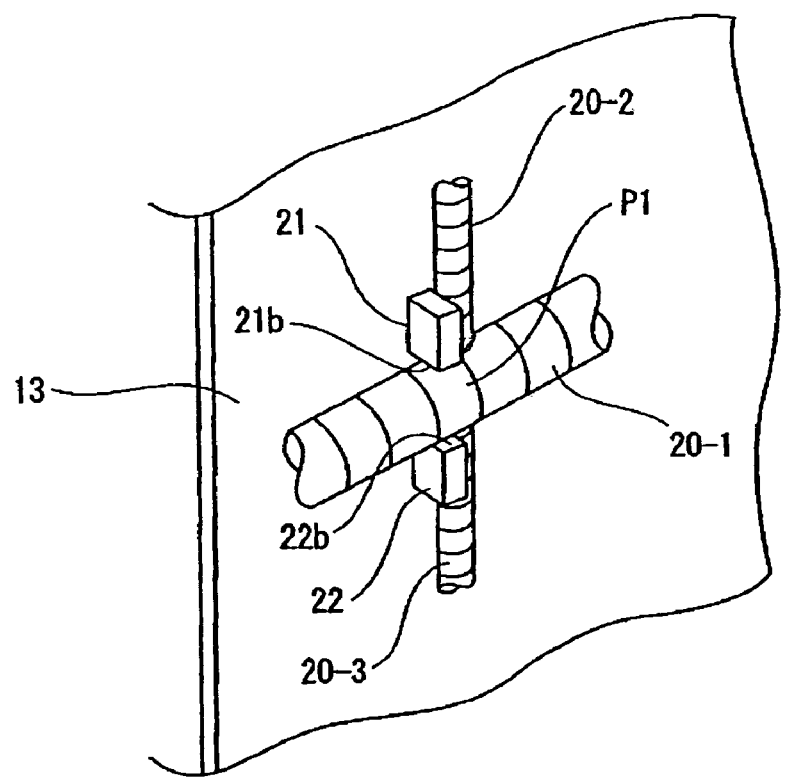
FIG. 5A is a perspective view of the wired state at the branching point P1 according to the embodiment of FIG. 3, with the door harnesses mounted.

As shown in FIGS. 4 and 5A, the projections 21 and 22 are arranged flanking the trunk portion 20-1 of the wire harness at a position nearest to the body panel relative to the first branching point P1. In this configuration, the rectangular faces 21b and 22b of the projections 21 and 22 hold the trunk portion 20-1 of the wire harness from both of its sides, and, typically, the large rectangular faces 21a and 22a thereof are placed into contact with the branched wire harness portions 20-2 and 20-3 and guide them in the branching directions. In other words, the projections 21 and 22 are arranged to form a gap whose size is substantially the same as the external diameter of the trunk portion of the wire harness 20-1, and the trunk portion is fitted into that gap between the projections 21 and 22.

Figure 5B:
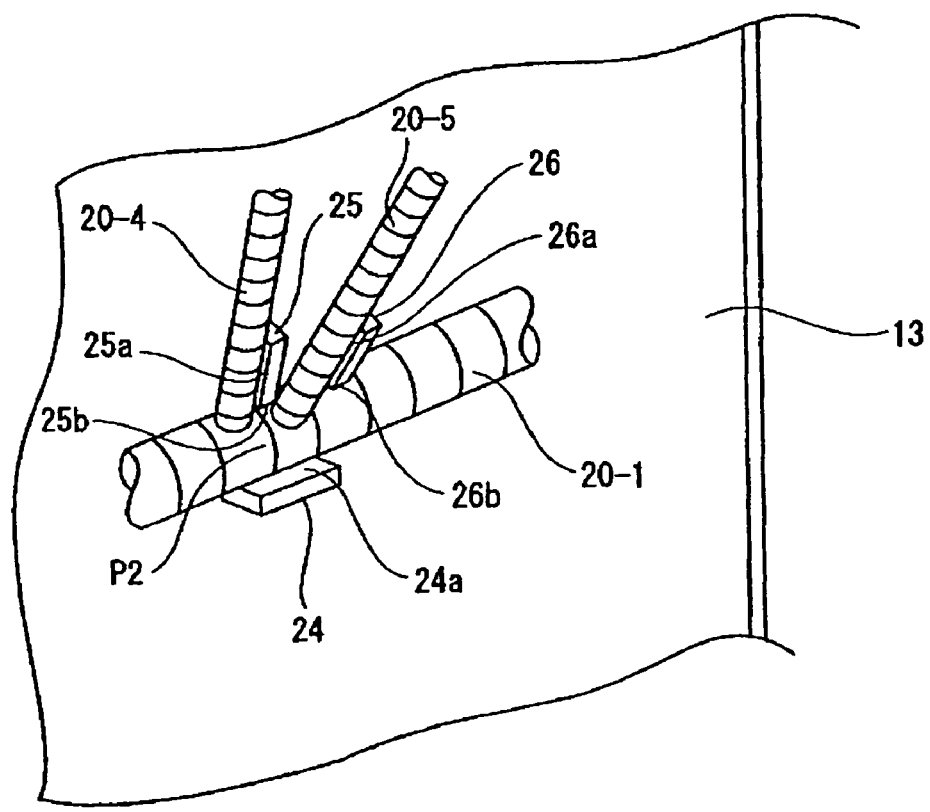
FIG. 5B is a perspective view of the wired state at the branching point P2 according to the embodiment of FIG. 3, with the door harnesses mounted.

Also, as shown in FIGS. 5A and 5B, the projection 24 is arranged adjacent to the trunk portion 20-1 of the wire harness at the side opposite to where the branched wire harness portions 20-4 and 20-5 are arranged. The large rectangular face 24a of the projection 24 is placed into contact with the trunk portion 21-1 of the wire harness. Further, the projections 25 and 26 are arranged adjacent, respectively, to branched wire harness portion 20-4 and branched wire harness portion 20-5, at the sides thereof farthest from the body panel. The large rectangular faces 25a and 26a of the projections 25 and 26 are placed into contact with the respective branched wire harnesses portions 20-4 and 20-5 and guide them in the branching directions. The rectangular faces 25b and 26b abut the trunk portion 20-1 of the wire harness.

In the door module 10 of the above construction, the projections 21 and 22, as well as the projections 24, 25 and 26, may be integral with the detachable panel 13. The detachable panel 13 and the projections 21, 22, 24, 25, 26 may be formed of any suitable material such as, for example, resin. They hold the trunk portion 20-1 of the wire harness from either side thereof at the branching points P1 and P2. Further, the projections 21, 22, 25 and 26 are aligned in the branching directions and are placed into contact with the branched wire harness portions 20-2, 20-3, 20-4, 20-5. In this manner, they can adjust and guide the branching directions.

As can be understood from the foregoing, by just providing the rectangular parallelepiped projections integrated to the detachable panel, it is unnecessary to use special clips. The number of component parts and assembling steps is thus reduced, and the detachable panel made of resin can be easily molded. The manufacturing costs of such door panel can thus be lowered considerably.

Figure 6A:
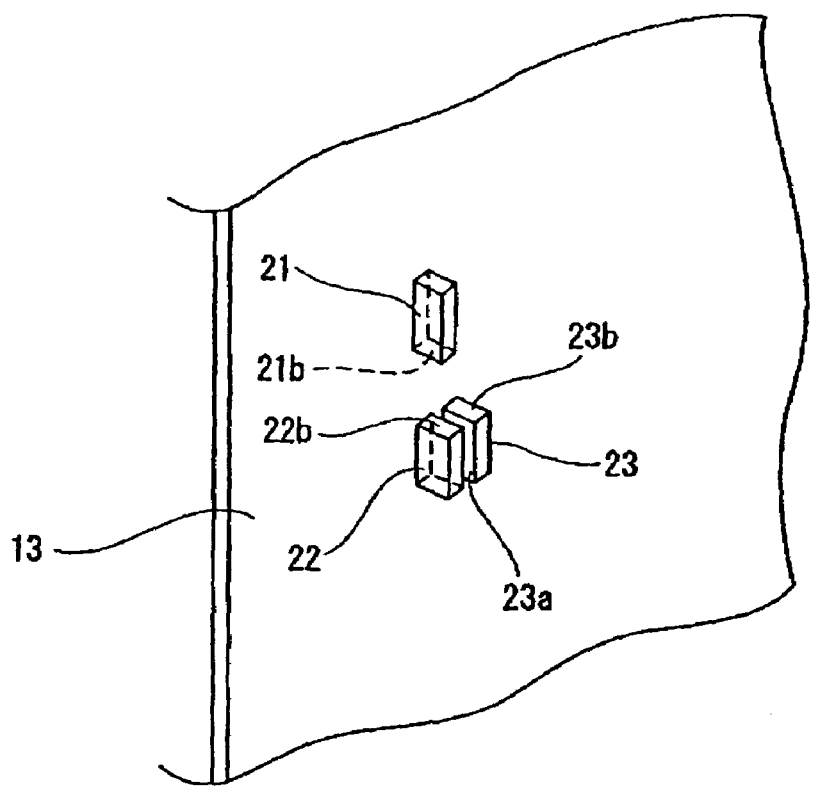
FIG. 6A is a perspective view of a portion of a door module according to a second embodiment of the present invention before the door harnesses are mounted.
Figure 6B:
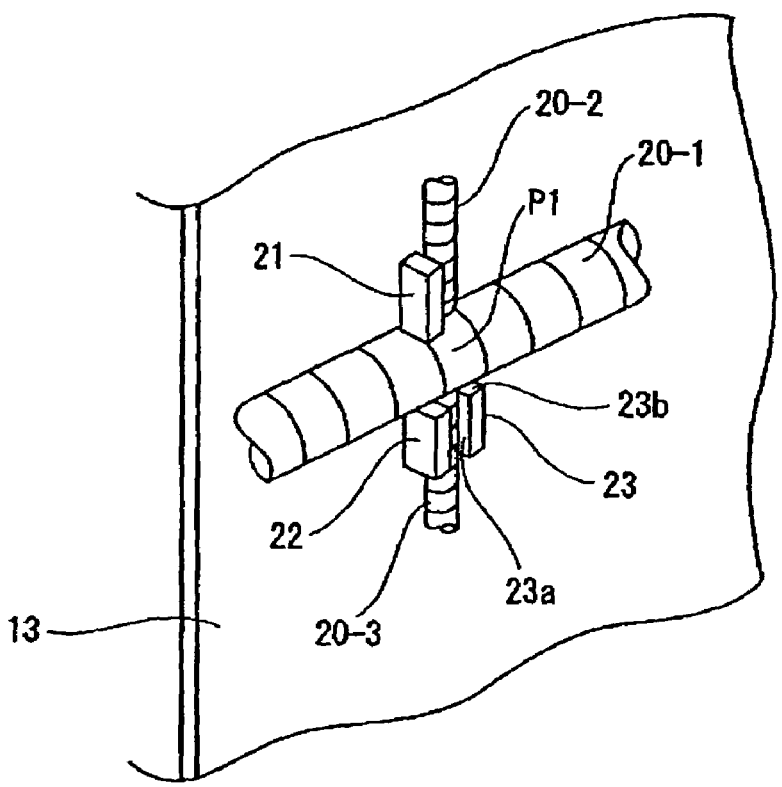
FIG. 6B is a perspective view of the portion of the door module according to the embodiment of FIG. 6A, with the door harnesses mounted.

FIGS. 6A and 6B show a second embodiment of the invention, in which three rectangular projections 21, 22, and 23 are arranged at a first branching point P1. The projections 21 and 22 are produced in the same manner as in the first embodiment, so the description is not repeated. In other words, they hold the trunk portion 20-1 of the wire harness at the side nearest to the body panel relative to the first branching point P1, while projection 23 flanks the trunk portion 20-1 of the wire harness from below, at the side farthest from the body panel relative to the first branching point P1. In the second embodiment, the branched wire harness portion 20-3 is held and fixed by the projections 22 and 23, so that the first branching point P1 is prevented from being displaced along the length direction of the trunk portion 20-1 of the wire harness.

Figure 7A:
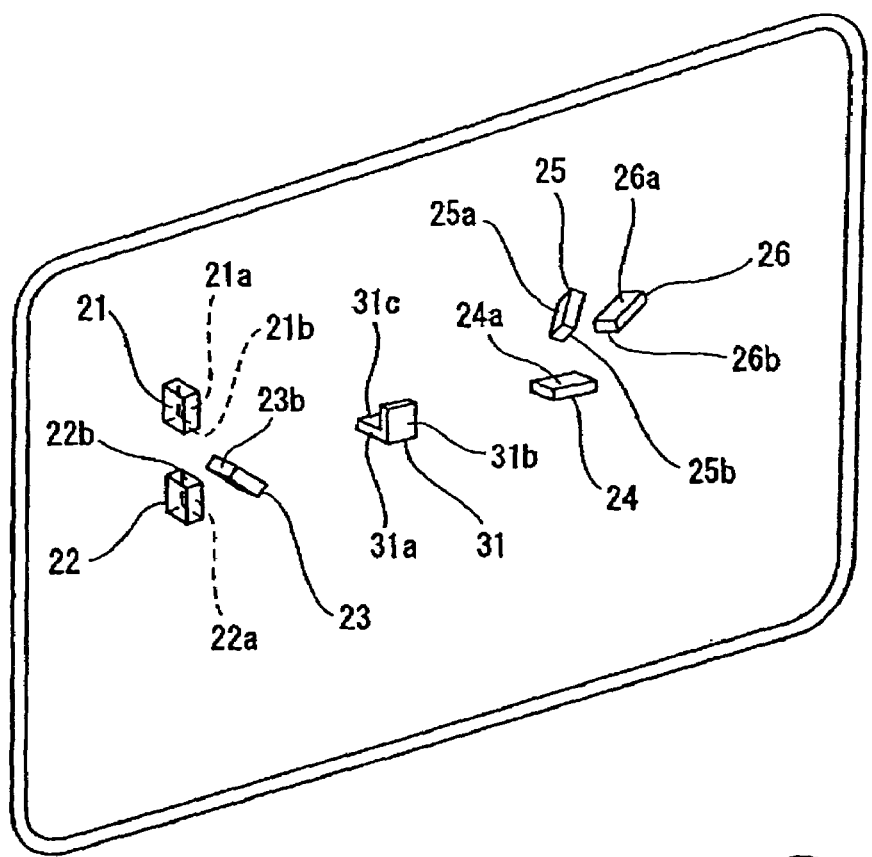
FIG. 7A is a perspective view of a portion of a door module according to a third embodiment of the present invention before the door harnesses are mounted.
Figure 7B:
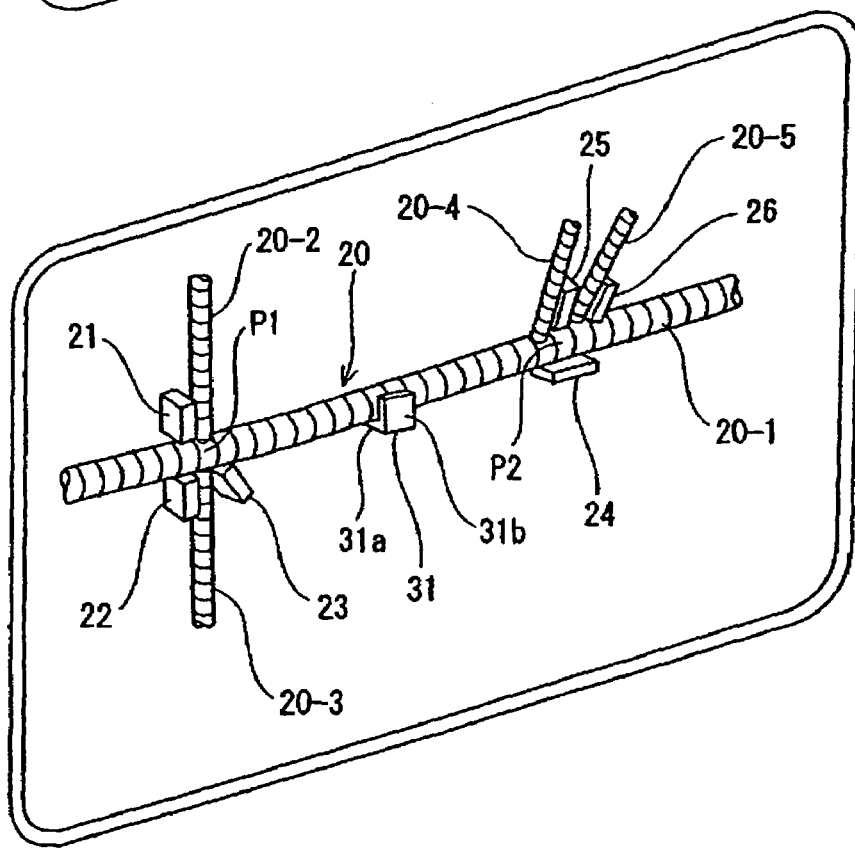
FIG. 7B is a perspective view of the portion of the door module according to the embodiment of FIG. 7A with the door harnesses mounted.

FIGS. 7A and 7B show a third embodiment of the present invention, in which an L-shaped projection 31 is provided, in addition to the projections 21, 22, 23, 24, 25, 26, at a position substantially half way between the branching points P1 and P2. The other configurations are as in the previous embodiments and shown by the same references, and the descriptions are not repeated. As shown in FIGS. 7A and 7B, the L-shaped projection 31 includes a first holding portion 31a projecting perpendicularly from the door panel, and a second holding portion 31b extending from the first holding portion 31a, in a direction substantially parallel to the door panel. The internal face 31c of the first holding portion 31a flanks the trunk portion 20-1 of the wire harness from below, while the second holding portion 31b covers the trunk portion 20-1 of the wire harness. In this configuration, the L-shaped projection 31 supports the trunk portion 20-1 of the wire harness 20-1 from below, and the second holding portion 31b of the L-shaped projection 31 prevents the trunk portion 20-1 of the wire harness from detaching away from the detachable panel.

Figure 8A:
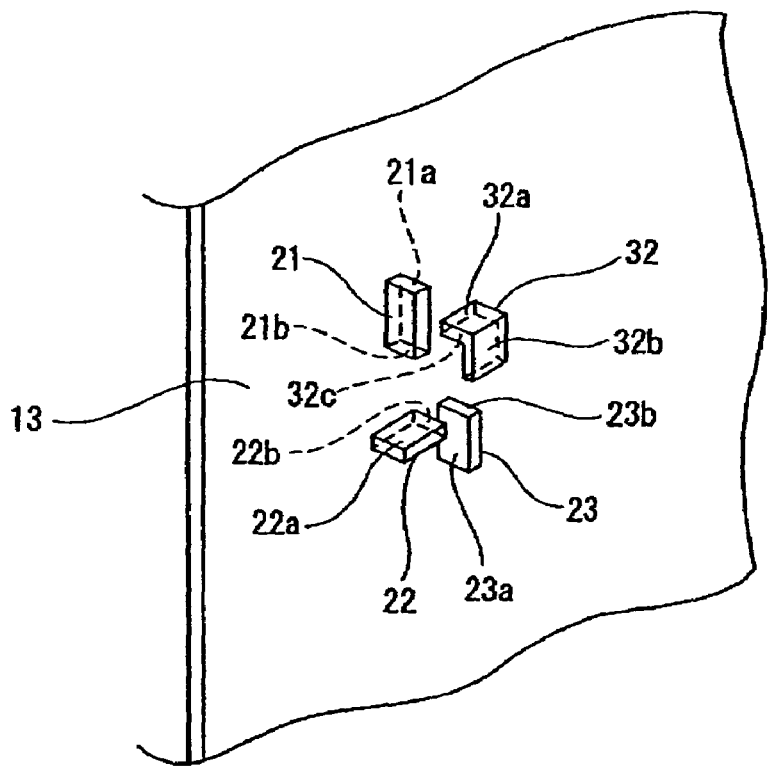
FIG. 8A is a perspective view of a portion of a door module according to a fourth embodiment of the present invention before the door harnesses are mounted.
Figure 8B:
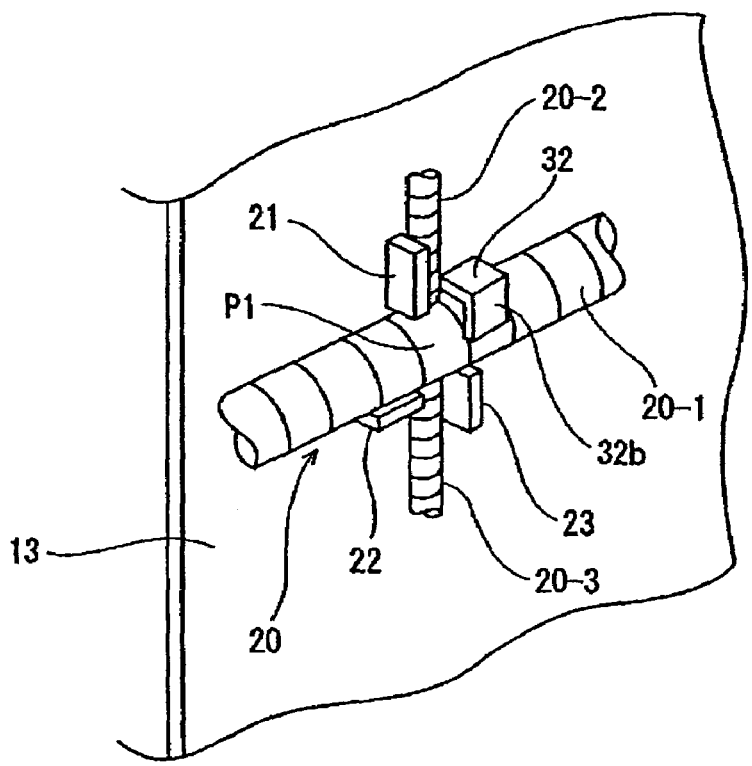
FIG. 8B is a perspective view of the portion of the door module according to the embodiment of FIG. 8A with the door harnesses mounted.

FIGS. 8A and 8B show a fourth embodiment of the present invention, in which three projections 21, 22, and 23 are arranged at the first branching point P1. In addition, an L-shaped projection 32 is provided on the periphery of and surrounding the first branching point P 1. The other configurations are the same as in the previous embodiments and the description is not repeated. Typically, the projections 21, 22, 23, 32, respectively, are arranged in a counter clockwise sequence around the first branching point P1, thereby surrounding both sides of the trunk portion 20-1 of the wire harness and branched wire harness portions 20-2 and 20-3. The large rectangular face 21a of projection 21 is placed in contact with branched wire harness portion 20-2 at the side of branching point P1 proximal to the body panel, and the large rectangular face 22a of projection 22 flanks the trunk portion 20-1 of the wire harness from below. Likewise, the large rectangular face 23a of projection 23 is placed in contact with branched wire harness portion 20-3 at the side of branching point P1 distal from the body panel, and the internal face 32c of the L-shaped projection 32 flanks the trunk portion 20-1 of the wire harness 20-1 from above. Further, the second holding portion 32b of the L-shaped projection 32 is bent over the trunk portion 20-1 of the wire harness.

In this embodiment, the trunk portion 20-1 of the wire harness and the branched wire harness portions 20-2 and 20-3 are firmly maintained, restraining the vertical movement and horizontal movement. Further, the wiring directions of the respective wire harness portions 20-1, 20-2, and 20-3 can be seen and understood at a glance. Further, the second holding portion 32b of the L-shaped projection 32 prevents longitudinal movement of the trunk portion 20-1 of the wire harness and of the branched wire harness portions 20-1, 20-2, and 20-3. Moreover, this configuration securely prevents the first branching point P1 from falling off the detachable panel 13.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Patent Application No. 2003-423283, filed on Dec. 19, 2003, which is herein expressly incorporated by reference in its entirety.

What is claimed is:

1. A door module to wire a door harness having a trunk wire harness portion and at least two branched wire harness portions connected to the trunk wire harness portion and extending along branching directions from a first branching point, said door module comprising:

a detachable panel configured to fit into a recessed portion formed in a door inner panel of a vehicle; and at least first and second projections integrally provided on said detachable panel, each projection formed as a generally rectangular parallelepiped having a first rectangular-face configured to hold the first branching point of the door harness and a second rectangular face configured to abut the trunk wire harness portion, said at least first and second projections arranged in a manner such that the trunk wire harness portion contacts a front surface of said detachable panel, wherein said at least first and second projections are arranged to define a gap, said gap having substantially the same size as the diameter of the trunk wire harness portion, wherein said gap is configured to grip the trunk wire harness portion along the respective second rectangular faces of the first and second projections when the trunk wire harness portion is mounted, from opposite sides of the trunk wire harness portion near the first branching point, and wherein said respective first rectangular faces extend along the branched wire harness portions and guide the branched wire harness portions in the branching directions.

2. The door module according to claim 1, wherein the first branching point is defined by a first side proximal to a body panel of the vehicle and a second side distal therefrom, wherein said first and second projections are placed in contact with one of the branched wire harness portions at the first side, and wherein a third projection is provided at the second side and placed in contact with the trunk wire harness portion and one of the branched wire harness portions at the second side.

3. The door module according to claim 2, wherein said detachable panel further includes a first substantially L-shaped projection provided adjacent the first branching point and configured to hold the trunk wire harness portion and one of the branched wire harness portions.

4. The door module according to claim 1, wherein the door harness includes at least two further branched wire harness portions connected to the trunk wire harness portion and extending in branching directions from a second branching point, wherein the detachable panel is integrally provided with at least fourth and fifth projections each having rectangular faces configured to hold the second branching point of the door harness, wherein said at least fourth and fifth projections are arranged to define a gap, said gap having substantially the same size as the diameter of the trunk wire harness portion, wherein said gap is configured to grip the trunk wire harness portion, when the trunk wire harness portion is mounted, from both sides thereof near the second branching point, and wherein said rectangular faces extend along the branched wire harness portions and guide the branched wire harness portions in the branching directions.

5. The door module according to claim 2, wherein the door harness includes at least two further branched wire harness portions connected to the trunk wire harness portion and extending in branching directions from a second branching point, wherein said detachable panel is integrally provided with at least fourth and fifth projections each having rectangular faces configured to hold the second branching point of the door harness, wherein said at least fourth and fifth projections are arranged to define a gap, said gap having substantially the same size as the diameter of the trunk wire harness portion, whereby said gap is configured to grip the trunk wire harness portion, when the trunk wire harness portion is mounted, from both sides thereof near the second branching point, and wherein said rectangular faces extend along the branched wire harness portions and guide the branched wire harness portions in the branching directions.

6. The door module according to claim 3, wherein the door harness includes at least two further branched wire harness portions connected to the trunk wire harness portion and extending in branching directions from a second branching point, wherein said detachable panel is integrally provided with at least fourth and fifth projections each having rectangular faces configured to hold the second branching point of said door harness, wherein said at least fourth and fifth projections are arranged to define a gap, said gap having substantially the same size as the diameter of the trunk wire harness portion, whereby said gap is configured to grip the trunk wire harness portion, when the trunk wire harness portion is mounted, from both sides thereof near the second branching point, and wherein said rectangular faces extend along the branched wire harness portions and guide the branched wire harness portions in the branching directions.

7. The door module according to claim 4, wherein the first and second branching points are defined, respectively, by a first side proximal to a body panel of the vehicle and a second side distal therefrom, wherein a sixth projection is provided at the second side of the second branching point and placed in contact with the trunk wire harness portion and one of the branched wire harness portions at the second side of the second branching point.

8. The door module according to claim 5, wherein the first and second branching points are defined, respectively, by a first side proximal to a body panel of the vehicle and a second side distal therefrom, wherein a sixth projection is provided at the second side of the second branching point and placed in contact with the trunk wire harness portion and one of the branched wire harness portions at the second side of the second branching point.

9. The door module according to claim 6, wherein the first and second branching points are defined, respectively, by a first side proximal to a body panel of the vehicle and a second side distal therefrom, wherein a sixth projection is provided at the second side of the second branching point and placed in contact with the trunk wire harness portion and one of the branched wire harness portions at the second side of the second branching point.

10. The door module according to claim 4, wherein said detachable panel integrally comprises a second substantially L-shaped projection positioned between the first branching point and the second branching point and configured to hold the trunk wire harness portion.

11. The door module according to claim 5, wherein said detachable panel integrally comprises a second substantially L-shaped projection positioned between the first branching point and the second branching point and configured to hold the trunk wire harness portion.

12. The door module according to claim 6, wherein said detachable panel integrally comprises a second substantially L-shaped projection positioned between the first branching point and the second branching point and configured to hold the trunk wire harness portion.

13. The door module according to claim 7, wherein said detachable panel integrally comprises a second substantially L-shaped projection positioned between the first branching point and the second branching point and configured to hold the trunk wire harness portion.

14. The door module according to claim 8, wherein said detachable panel integrally comprises a second substantially L-shaped projection positioned between the first branching point and the second branching point and configured to hold the trunk wire harness portion.

15. The door module according to claim 9, wherein said detachable panel integrally comprises a second substantially L-shaped projection positioned between the first branching point and the second branching point and configured to hold the trunk wire harness portion.

16. A system to wire a door harness in a door inner panel, the door harness including a trunk wire harness portion and at least two branched wire harness portions connected to the trunk wire harness portion and extending along branching directions from a first branching point, said system comprising:
  a door module comprising a detachable panel and configured to wire the door harness, said detachable panel configured to fit into a recessed portion formed in the door inner panel of a vehicle;
  at least first and second projections integrally provided on said detachable panel, each said first and second projections formed as a generally rectangular parallelepiped having a first rectangular face configured to hold the first branching point of the door harness and a second rectangular face configured to abut the trunk wire harness portion, said at least first and second projections arranged in a manner such that the trunk wire harness portion contacts a front surface of said detachable panel,
  wherein said at least first and second projections are arranged to define a gap, said gap having substantially the same size as the diameter of the trunk wire harness portion,
  wherein said gap is configured to grip the trunk wire harness portion along the respective second rectangular faces of the first and second projections, when the trunk wire harness portion is mounted, from opposite sides of the trunk wire harness near the first branching point, and
  wherein said respective first rectangular faces extend along the branched wire harness portions and guide the branched wire harness portions in the branching directions.

17. The system to wire a door harness according to claim 16, wherein the first branching point is defined by a first side proximal to a body panel of the vehicle and a second side distal therefrom, wherein said first and second projections are placed in contact with one of the branched wire harnesses at the first side, and wherein a third projection is provided at the second side and placed in contact with the trunk wire harness portion and one of the branched wire harness portions at the second side.

18. The system for wiring a door harness according to claim 17, wherein said detachable panel further includes a first substantially L-shaped projection positioned near the first branching point and configured to hold the trunk wire harness portion and one of the branched wire harness portions.

19. The system to wire a door harness according to claim 16, wherein the door harness comprises at least two further branched wire harness portions connected to the trunk wire harness portion and extending in branching directions from a second branching point, wherein said detachable panel is integrally provided with at least fourth and fifth projections each having rectangular faces configured to hold the second branching point of the door harness, wherein said at least fourth and fifth projections are arranged to define a gap, said gap having substantially the same size as the diameter of the trunk wire harness portion, wherein said gap is configured to grip the trunk wire harness portion, when the trunk wire harness portion is mounted, from both sides thereof near the second branching point, and wherein said rectangular faces extend along the branched wire harness portions and guide the branched wire harness portions in the branching directions.

20. The system to wire a door harness according to claim 19, wherein said detachable panel integrally comprises a second substantially L-shaped projection positioned between the first branching point and the second branching point and configured to hold the trunk wire harness portion.

* * * * *